US012365325B2

(12) United States Patent
Lo et al.

(10) Patent No.: US 12,365,325 B2
(45) Date of Patent: Jul. 22, 2025

(54) BRAKE ACTUATOR CONTROL SYSTEMS AND METHODS

(71) Applicant: GM GLOBAL TECHNOLOGY OPERATIONS LLC, Detroit, MI (US)

(72) Inventors: Joshua Lo, Whitby (CA); Edward Thomas Heil, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 219 days.

(21) Appl. No.: 18/120,713

(22) Filed: Mar. 13, 2023

(65) Prior Publication Data

US 2024/0308493 A1  Sep. 19, 2024

(51) Int. Cl.
*B60T 17/22* (2006.01)
*B60T 13/74* (2006.01)
*B60W 10/192* (2012.01)

(52) U.S. Cl.
CPC .......... *B60T 17/221* (2013.01); *B60T 13/741* (2013.01); *B60W 10/192* (2013.01); *B60T 2270/406* (2013.01)

(58) Field of Classification Search
CPC ................. B60T 17/221; B60T 13/741; B60T 2270/406; B60T 8/1769; B60W 10/192
USPC ................................. 701/71, 78, 79
See application file for complete search history.

(56) References Cited

U.S. PATENT DOCUMENTS

| | | | |
|---|---|---|---|
| 5,090,518 A * | 2/1992 | Schenk | B60T 8/00 188/72.1 |
| 6,412,885 B1 * | 7/2002 | Shirai | B60T 8/1755 303/189 |
| 6,464,308 B2 * | 10/2002 | Kubota | B60T 13/741 303/3 |
| 6,902,241 B2 * | 6/2005 | Yamamoto | B60T 8/246 303/146 |
| 7,445,091 B2 * | 11/2008 | Kawahara | B60T 8/24 188/158 |
| 7,734,406 B1 * | 6/2010 | Oppenheimer | B60T 8/885 180/443 |
| 7,992,691 B2 * | 8/2011 | Maron | B60T 17/221 188/158 |
| 8,489,302 B2 * | 7/2013 | Cahill | B64C 25/44 701/76 |
| 8,521,388 B2 * | 8/2013 | Baehrle-Miller | B60T 7/042 701/70 |
| 9,321,439 B2 * | 4/2016 | Baehrle-Miller | B60T 8/172 |
| 9,856,936 B2 * | 1/2018 | Masuda | H02K 7/06 |
| 10,471,946 B2 * | 11/2019 | Baehrle-Miller | B60T 13/741 |

(Continued)

FOREIGN PATENT DOCUMENTS

WO    WO-2011032754 A1 *   3/2011    ............ B60T 13/588

*Primary Examiner* — Phutthiwat Wongwian
*Assistant Examiner* — Brian R Kirby

(57) ABSTRACT

A brake actuator control system for a vehicle includes: a maximum load module configured to determine maximum clamping loads of brake actuators, respectively, of the vehicle, the brake actuators configured to, independently of each other, slow rotation of wheels, respectively, of the vehicle; a limit module configured to set a load limit to a minimum one of the maximum clamping loads of the brake actuators; a target load module configured to limit a target load for the brake actuators to less than or equal to the load limit; and a power control module configured to apply power to electric motors of the brake actuators, respectively, based on the target load.

20 Claims, 7 Drawing Sheets

(56) References Cited

U.S. PATENT DOCUMENTS

| | | | | |
|---|---|---|---|---|
| 2002/0008423 | A1* | 1/2002 | Yasui | B60T 8/246 303/9.62 |
| 2005/0035653 | A1* | 2/2005 | Godlewsky | B60T 17/22 303/122.03 |
| 2006/0163939 | A1* | 7/2006 | Kuramochi | B60T 8/885 303/122.04 |
| 2006/0261764 | A1* | 11/2006 | Erben | B60T 7/045 318/139 |
| 2008/0071451 | A1* | 3/2008 | Yamaguchi | B60W 10/08 701/69 |
| 2008/0284358 | A1* | 11/2008 | Ralea | B60T 13/741 318/561 |
| 2009/0210126 | A1* | 8/2009 | Dellac | B64C 25/48 701/70 |
| 2010/0062897 | A1* | 3/2010 | Nishino | B60T 7/042 477/29 |
| 2010/0274457 | A1* | 10/2010 | Cahill | B60T 8/1703 701/70 |
| 2011/0224880 | A1* | 9/2011 | Baehrle-Miller | B60T 7/085 701/70 |
| 2014/0156160 | A1* | 6/2014 | DeVlieg | B60T 8/00 701/70 |
| 2015/0066324 | A1* | 3/2015 | Baehrle-Miller | B60T 13/741 701/70 |
| 2016/0290425 | A1* | 10/2016 | Baehrle-Miller | B60T 13/741 |
| 2017/0011568 | A1* | 1/2017 | Romana | B60T 8/1703 |
| 2017/0028975 | A1* | 2/2017 | Suermann | B60T 8/17616 |
| 2017/0174201 | A1* | 6/2017 | Georgin | B60T 13/74 |
| 2018/0079403 | A1* | 3/2018 | Masuda | B60T 8/172 |
| 2018/0148022 | A1* | 5/2018 | Misumi | B60T 17/221 |
| 2020/0324649 | A1* | 10/2020 | Gully | B60W 10/14 |
| 2020/0324744 | A1* | 10/2020 | Mizusaki | B60T 13/686 |
| 2020/0324751 | A1* | 10/2020 | Englert | B60T 17/221 |
| 2022/0274691 | A1* | 9/2022 | Howell | B60T 13/686 |
| 2024/0294159 | A1* | 9/2024 | Ramirez Hernandez | H02P 23/14 |

* cited by examiner

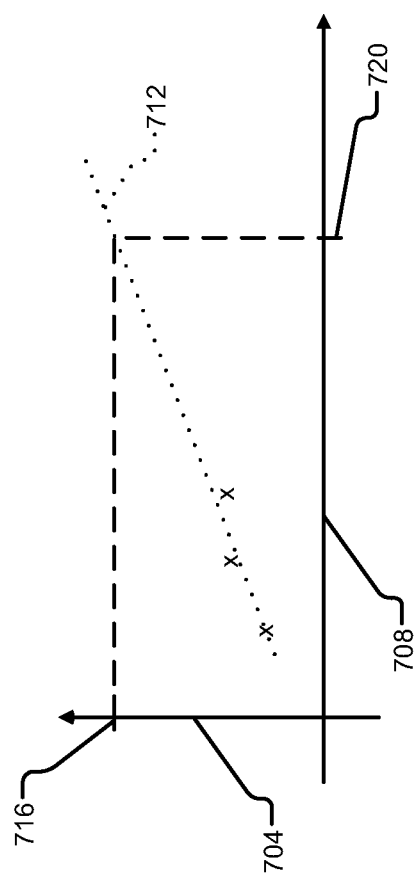

BRAKE ACTUATOR CONTROL SYSTEMS AND METHODS

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to brake systems of vehicles and more particularly to systems and methods for controlling brake actuators of vehicles.

Vehicles include one or more torque producing devices, such as an internal combustion engine and/or an electric motor. The torque producing device(s) are used to output torque for propulsion of the vehicle.

Passengers of a vehicle ride within a passenger cabin (or passenger compartment) of the vehicle. A driver actuates an accelerator pedal to input a request for acceleration of the vehicle. The driver actuates a brake pedal of the vehicle to input a request for deceleration of the vehicle. The driver turns a steering wheel to turn or steer or to input a request to turn or steer the vehicle left or right.

A brake system of the vehicle applies friction brakes to rotors, respectively, to slow wheels of the vehicle in response to actuation of the brake pedal.

SUMMARY

In a feature, a brake actuator control system for a vehicle includes: a maximum load module configured to determine maximum clamping loads of brake actuators, respectively, of the vehicle, the brake actuators configured to, independently of each other, slow rotation of wheels, respectively, of the vehicle; a limit module configured to set a load limit to a minimum one of the maximum clamping loads of the brake actuators; a target load module configured to limit a target load for the brake actuators to less than or equal to the load limit; and a power control module configured to apply power to electric motors of the brake actuators, respectively, based on the target load.

In further features, the target load module is configured to determine the target load based on a brake pedal position.

In further features, the maximum load module is configured to determine the maximum clamping loads of brake actuators, respectively, while the vehicle is off.

In further features, the maximum load module is configured to determine one of the maximum clamping loads of one of the brake actuators based on: a first current through the one of the brake actuators at a first value of the target load at a first time; and a second current through the one of the brake actuators at a second value of the target load at a second time, where the second value is one of greater than and less than the first value.

In further features: the second time is after the first time; and the second value is greater than the first value.

In further features, the maximum load module is configured to: fit a line based on the first current, the first value, the second current, and the second value; and determine the one of the maximum clamping loads of the one of the brake actuators based on the line.

In further features, the maximum load module is configured to determine the one of the maximum clamping load of the one of the brake actuators based on a value of load where a predetermined maximum current intercepts the line.

In further features, the maximum load module is configured to fit the line using at least one of linear regression and least squares line fitting.

In further features, the maximum load module is configured to determine the one of the maximum clamping loads of the one of the brake actuators further based on: a third current through the one of the brake actuators at a third value of the target load at a third time, where the third value is different than the first and second values.

In further features: the second time is after the first time and the third time is after the second time, and the second value is greater than the first value, and the third value is greater than the second value.

In further features, the first and second currents are measured when first and second voltages on the one of the brake actuators are within a predetermined voltage range.

In further features, the brake actuators are one of electro mechanical brake actuators and electro hydraulic brake actuators.

In further features, a diagnostic module is configured to diagnose degradation of at least one of the brake actuators based on the load limit.

In further features, the diagnostic module is configured to output an indicator that at least one of the brake actuators is degraded when the load limit is less than a predetermined value.

In further features, the diagnostic module is configured to at least one of: audibly output the indicator via a speaker; and visually output the indicator on a display.

In further features, the diagnostic module is configured to schedule performance of a diagnostic of the brake actuators when the load limit is less than a second predetermined value.

In further features, the second predetermined value is less than the predetermined value.

In a feature, a brake actuator control method for a vehicle includes: determining maximum clamping loads of brake actuators, respectively, of the vehicle, the brake actuators configured to, independently of each other, slow rotation of wheels, respectively, of the vehicle; setting a load limit to a minimum one of the maximum clamping loads of the brake actuators; limiting a target load for the brake actuators to less than or equal to the load limit; and applying power to electric motors of the brake actuators, respectively, based on the target load.

In further features, the method further includes determining the target load based on a brake pedal position.

In further features, the determining maximum clamping loads of brake actuators includes determining the maximum clamping loads of the brake actuators, respectively, while the vehicle is off.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 7 includes an example graph of current versus load of a brake actuator.

In the drawings, reference numbers may be reused to identify similar and/or identical elements.

DETAILED DESCRIPTION

Boosted brake systems of vehicles may include a brake booster that provides hydraulic fluid to calipers of wheels, respectively, of the vehicle. Since all of the calipers are connected hydraulically, the pressure of the hydraulic fluid at each caliper should be approximately equal. Degradation of the brake booster may decrease a maximum achievable pressure, but should not result in an imbalance of pressure between the calipers.

The present application involves individual/independent pressure/force generating brake actuators for the wheels, respectively. Each brake actuator applies pressure to a rotor of its wheel independently of the other brake actuators. Degradation of the brake actuators, however, may cause an imbalance between maximum braking loads achievable by the brake actuators. Unequal loads being applied by the brake actuators may lead to vehicle yaw and/or movement of a steering wheel that may be observable by a driver.

The present application involves determining maximum loads achievable by the brake actuators, respectively, and setting a load limit for all of the brake actuators based on a smallest one of the maximum loads. All of the brake actuators will therefore be limited to the smallest one of the maximum loads in the event that a target load becomes greater than the load limit. This may prevent or minimize yaw of the vehicle and/or movement of the steering wheel. Degradation of one or more of the brake actuators can also be diagnosed based on the load limit. Increasing degradation may be indicated by the load limit decreasing.

Figure 1:
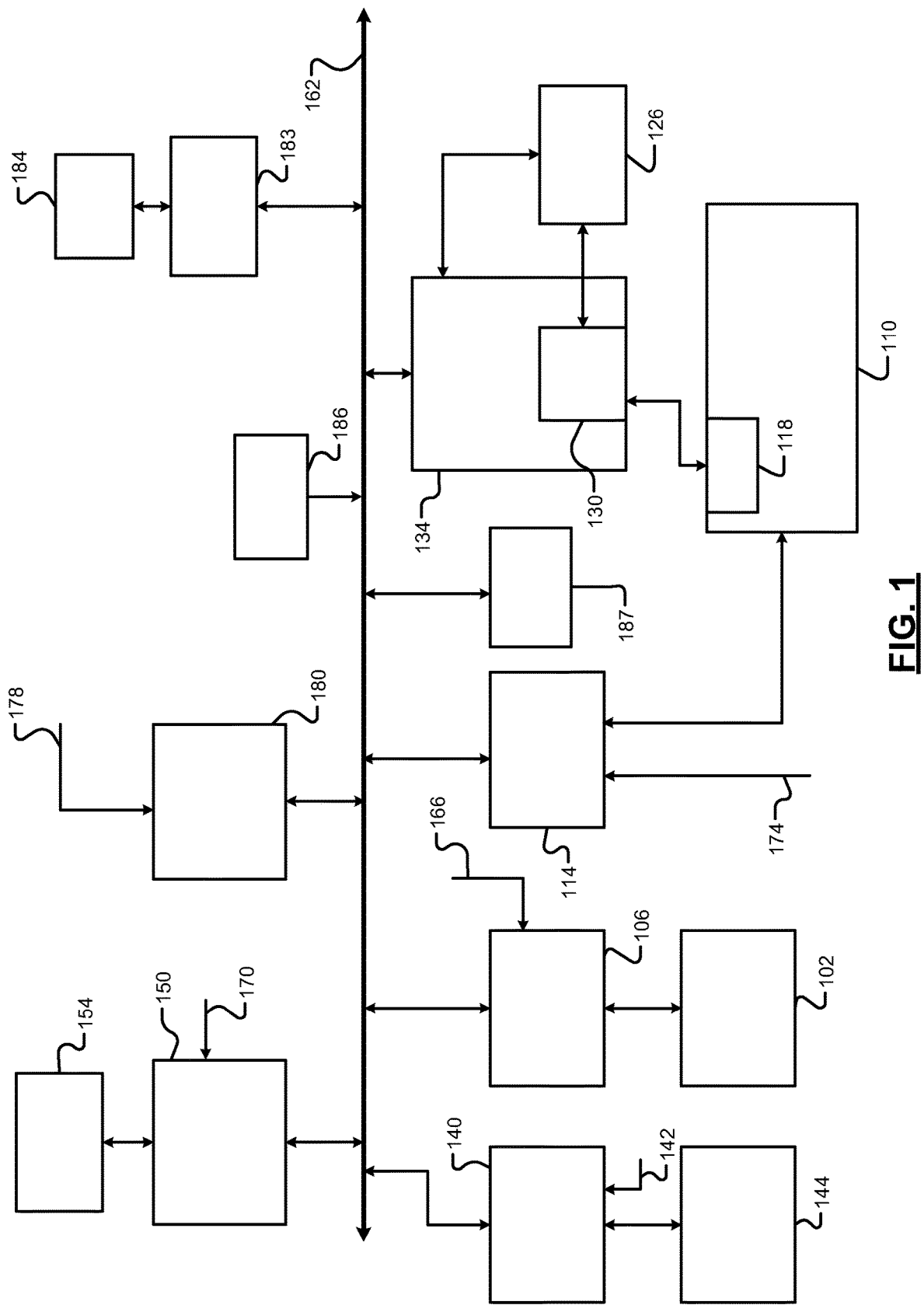
FIG. 1 is a functional block diagram of an example vehicle system.

Referring now to FIG. 1, a functional block diagram of an example vehicle system is presented. While a vehicle system for a hybrid vehicle is shown and will be described, the present application is also applicable to non-hybrid vehicles, electric vehicles, fuel cell vehicles, and other types of vehicles. The present application is applicable to autonomous vehicles, semi-autonomous vehicles, non-autonomous vehicles, shared vehicles, non-shared vehicles, and other types of vehicles.

An engine 102 may combust an air/fuel mixture to generate drive torque. An engine control module (ECM) 106 controls the engine 102. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 102 may be omitted.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor.

A power inverter module (PIM) 134 may control the electric motor 118 and the PCD 130. The PCD 130 applies power from the battery 126 to the electric motor 118 based on signals from the PIM 134, and the PCD 130 provides power output by the electric motor 118, for example, to the battery 126. The PIM 134 may include, for example, an inverter.

A steering control module 140 controls steering/turning of wheels of the vehicle, for example, based on driver turning of a steering wheel within the vehicle and/or steering commands from one or more vehicle control modules. A steering wheel angle (SWA) sensor (not shown) monitors rotational position of the steering wheel and generates a SWA 142 based on the position of the steering wheel. As an example, the steering control module 140 may control vehicle steering via an electronic power steering (EPS) motor 144 based on the SWA 142. However, the vehicle may include another type of steering system.

A brake control module 150 may controls actuation of brake actuators 154 (brake actuator modules) of the vehicle based on one or more driver inputs, such as a brake pedal position (BPP) 170. The brake actuators 154 control application of friction brakes at the wheels, respectively, of the vehicle.

Modules of the vehicle may share parameters via a network 162, such as a controller area network (CAN). A CAN may also be referred to as a car area network. For example, the network 162 may include one or more data buses. Various parameters may be made available by a given module to other modules via the network 162.

The driver inputs may include, for example, an accelerator pedal position (APP) 166 which may be provided to the ECM 106. The BPP 170 may be provided to the brake control module 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

An infotainment module 183 may output various information via one or more output devices 184. The output devices 184 may include, for example, one or more displays (non-touch screen and/or touch screen), one or more other suitable types of video output devices, one or more speakers, one or more haptic devices, and/or one or more other suitable types of output devices.

The infotainment module 183 may output video via the one or more displays. The infotainment module 183 may output audio via the one or more speakers. The infotainment module 183 may output other feedback via one or more haptic devices. For example, haptic devices may be included with one or more seats, in one or more seat belts, in the steering wheel, etc. Examples of displays may include, for example, one or more displays (e.g., on a front console) of the vehicle, a head up display (HUD) that displays information via a substrate (e.g., windshield), one or more displays that drop downwardly or extend upwardly to form panoramic views, and/or one or more other suitable displays.

The vehicle may include a plurality of external sensors and cameras, generally illustrated in FIG. 1 by 186. One or more actions may be taken based on input from the external sensors and cameras 186. For example, the infotainment module 183 may display video, various views, and/or alerts on a display via input from the external sensors and cameras 186 during driving.

The vehicle may include one or more additional control modules that are not shown, such as a chassis control module, a battery pack control module, etc. The vehicle may omit one or more of the control modules shown and discussed.

Figure 2:
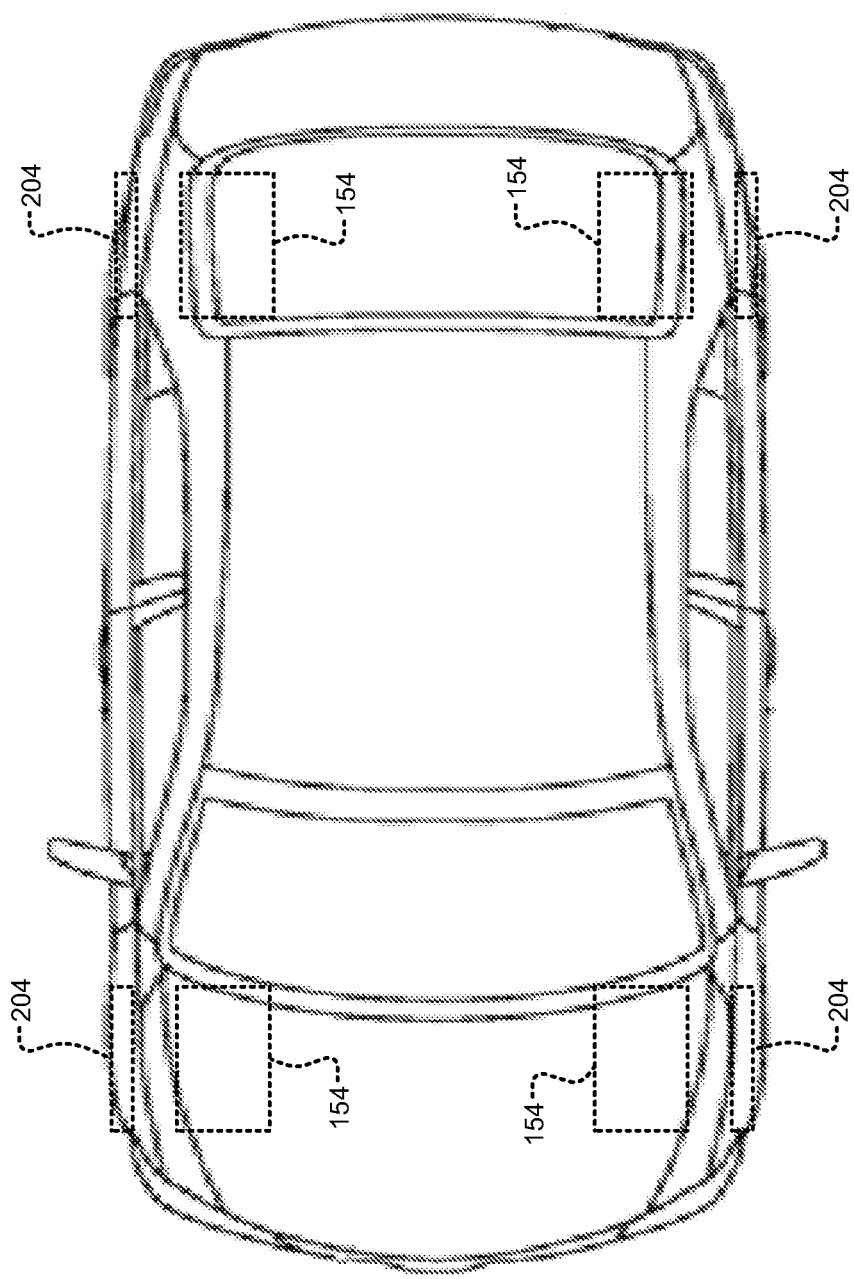
FIG. 2 is a top view of an example vehicle including brake actuators.

FIG. 2 is a top view of an example vehicle and illustrates examples of wheels 204 and the brake actuators 154, respectively. The brake actuators 154 are configured to apply friction brakes and slow rotation of the wheels 204, respectively. One brake actuator 154 is provided per wheel. The brake actuators 154 may be, for example, electromechanical or electro-hydraulic brake actuators and each include an independent pressure/force generation device that applies one or more brake pads to a rotor of that wheel.

It is possible for each brake actuator 154 to apply a different braking force, such as via degradation. Degradation may cause the brake actuators 154 to have different maximum braking capabilities and application gradients. Unequal maximum braking capability and/or gradient may create one or more yaw and/or physically observable conditions. For example, when a brake clamp request for the brake actuators 154 is high (e.g., greater than a predetermined value), unequal braking of the wheels may occur, which may cause yaw and/or torque transmission to the driver via the steering wheel.

Figure 3:
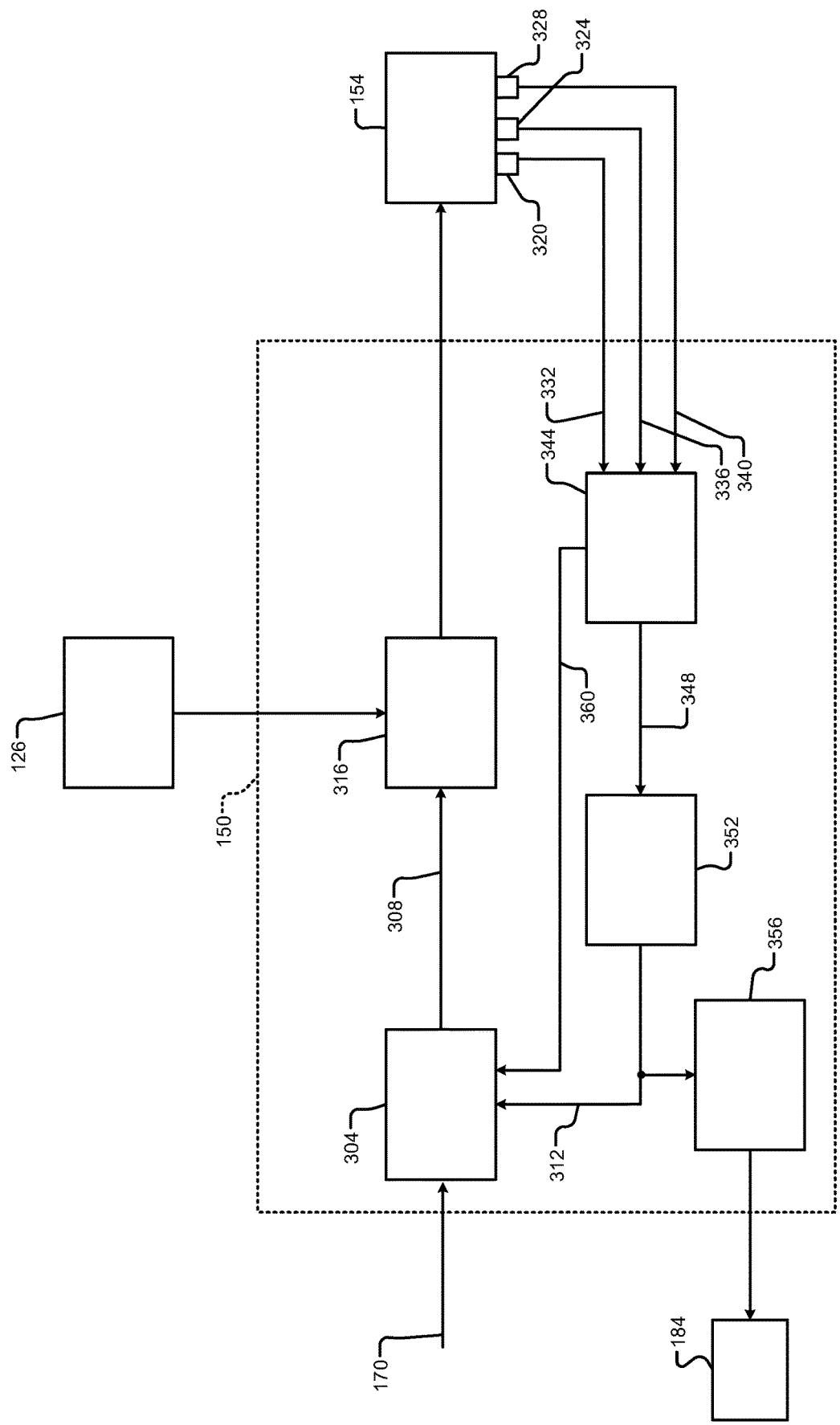
FIG. 3 is a functional block diagram of an example implementation of a brake control module.

FIG. 3 is a functional block diagram of an example implementation of the brake control module 150. Generally, while the vehicle is on, a target load module 304 determines a target (clamp) load 308 for the brake actuators 154 based on the BPP 170. For example, the target load module 304 may determine the target load 308 using one of an equation and a lookup table that relates BPPs to target loads. The target load 308 may increase as the BPP depression increases and vice versa. The target load 308 may correspond to a target clamp load to be applied to rotors of the wheels by the brake actuators 154.

The target load module 304 upper limits the target load 308 to a clamp load limit 312. In other words, when the target load 308 determined based on the BPP is greater than the clamp load limit 312, the target load module 304 sets the target load 308 to the clamp load limit 312. When the target load 308 determined based on the BPP is less than the clamp load limit 312, the target load module 304 sets the target load 308 based on the BPP 170 as discussed above. Determination of the clamp load limit 312 is discussed further below.

A power control module 316 applies power to the electric motors of the brake actuators 154, respectively, to achieve the target load 308. The power control module 316 may apply power from the battery 126 to the electric motors of the brake actuators 154. In various implementations, the power control module 316 may convert direct current (DC) power from the battery 126 into alternating current (AC) power and apply AC power to the electric motors. While an example implementation is shown, the power control module 316 (and/or one or more other modules) may be implemented differently. For example, the power control module 316 may be implemented within the brake control module or in the brake actuators 154. In various implementations, the target load may be transmitted as a serial data message to the brake actuators 154 to be executed by the brake actuators 154. In this example, the brake actuators 154 each include a power control module and control themselves to achieve the target load.

A current sensor 320, a voltage sensor 324, and a load (e.g., force) sensor 328 may be provided for each of the brake actuators 154. The current sensor 320 of a brake actuator measures the present current 332 to that brake actuator. The voltage sensor 324 of a brake actuator measures the present voltage 336 applied to that brake actuator. The load sensor 328 of a brake actuator measures the present load 340 applied by that brake actuator. In various implementations, a load module may determine the present load 340, for example, based on the current 322 and a delta position that is calculated from a motor position measured by a position sensor beginning at the point where the current begins to increase. In this example, the load sensor 328 may be omitted. The stiffness of the system (which may be empirically derived) can be used by the load module with the delta position from the touch point of the brake pads to the rotor to estimate the load 340. The integrity of the load estimate that is determined by the load module can be compared to the current sensor to ensure the stiffness of the system is within pre-defined boundaries.

A maximum load module 344 determines a maximum (clamp) load for each of the brake actuators 154 as discussed further below with respect to FIG. 4. The maximum loads of the brake actuators 154 are collectively illustrated by 348 in FIG. 3. In various implementations, a maximum load module may be implemented within each of the brake actuators 154 and determine that brake actuators maximum load. The maximum load may be communicated to the brake control module 150.

A limit module 352 determines the clamp load limit 312 based on the maximum loads 348. For example, the limit module 352 may determine a smallest (least) one of the maximum loads of the brake actuators 154, respectively, and set the clamp load limit 312 to the smallest one of the maximum loads 348. In this manner, brake actuators that could produce more load are limited to the clamp load limit 312 such that each of the brake actuators will apply the same load to its rotor when the target load 308 is set to the clamp load limit 312. This prevents yaw of the vehicle and/or steering wheel movement experienced by the driver that could occur if the brake actuators 154 apply different loads on the respective rotors.

In various implementations, a diagnostic module 356 may monitor the clamp load limit 312. If the clamp load limit indicates degradation of one or more of the brake actuators 154 (e.g., is less than a first predetermined load), the diagnostic module 356 may output an indicator of degradation of one or more of the brake actuators 154 audibly and/or visibly via one or more of the output devices 184, such as via one or more displays, lights, and/or speakers. In various implementations, the diagnostic module 356 may communicate the indicator to an account (e.g., phone number, email address, etc.) associated with an owner or manager of the vehicle. If the clamp load limit indicates a greater amount of degradation of one or more of the brake actuators 154 (e.g., is less than a second predetermined load), the diagnostic module 356 may schedule performance of a high force diagnostic, such as when at least a predetermined distance has been traveled by the vehicle since a last performance of the high force diagnostic. The high force diagnostic may involve controlling the brake actuators 154 to achieve maximum possible loads and determining whether the maximum possible loads are less than a predetermined load by at least a predetermined amount.

Figure 4:
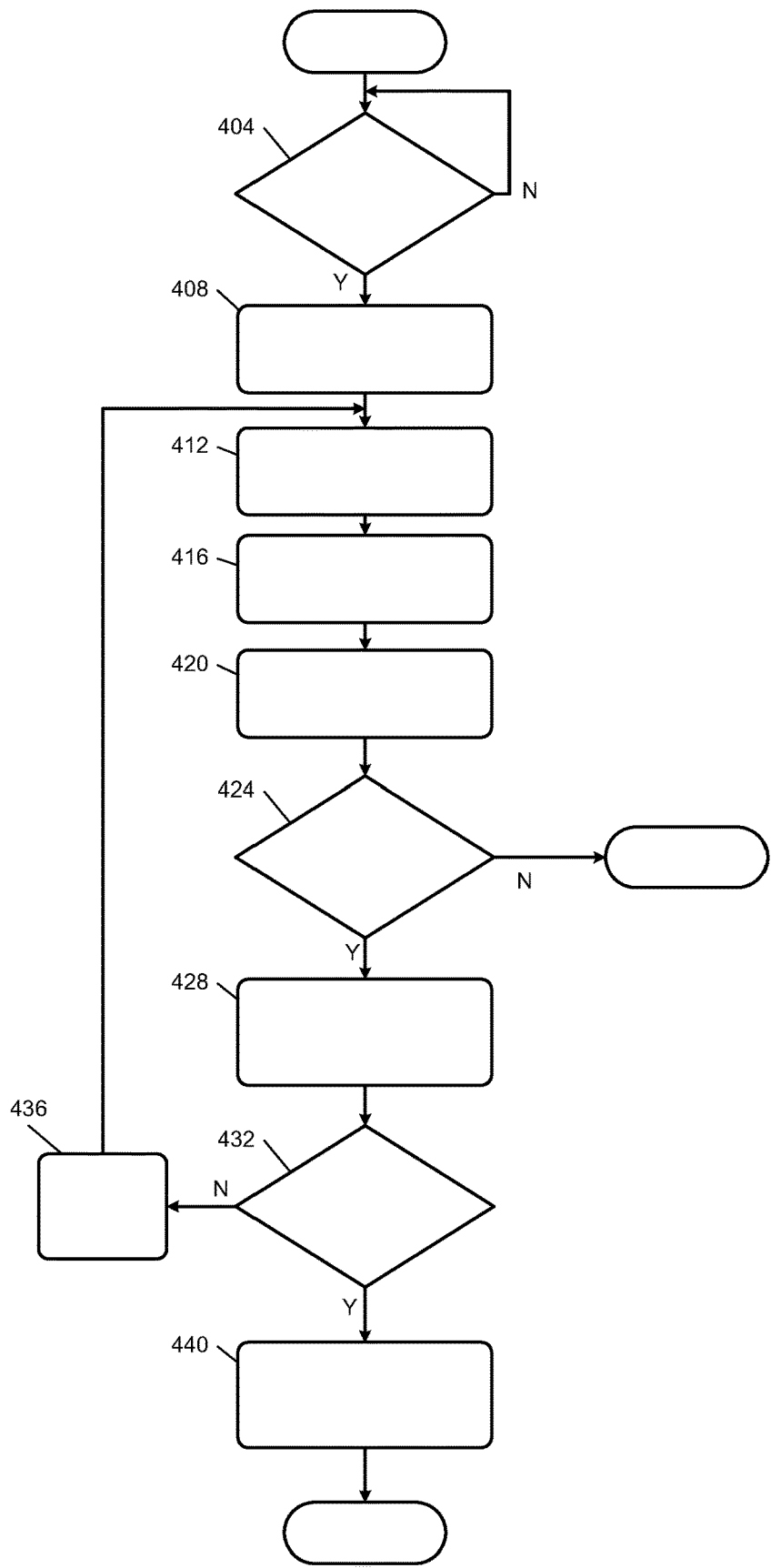
FIG. 4 is a flowchart depicting an example method of determining the maximum load for a brake actuator.

FIG. 4 is a flowchart depicting an example method of determining the maximum load 348 for one of the brake actuators 154. FIG. 4 may be performed for each brake actuator to determine its maximum load.

Control begins with 404 where the maximum load module 344 may determine whether the vehicle is off. If 404 is true, control may continue. If 404 is false, control may remain at 404. In this manner, the maximum loads 348 are determined while the vehicle is off.

At 408, the maximum load module 344 may set a counter value (i) equal to 1. At 412, the maximum load module 344 selects an i-th predetermined target load (e.g., from memory) and instructs (via 360 of FIG. 3) the target load module 304 to set the target load 308 to the i-th predetermined target load. The target load module 304 sets the target load 308 to the i-th predetermined target load in response to the instruction 360.

At 416, the power control module 316 applies power to the one of the brake actuators 154 to adjust the output torque of the electric motor of the one of the brake actuators 154 to achieve the target load 308. Once the target load 308 is achieved by the one of the brake actuators 154, the target load 308 is held for a predetermined period at 420, such as to allow the voltage 336 and the current 332 to stabilize.

At 424, the maximum load module 344 determines whether the voltage 336 on the one of the brake actuators 154 is within a predetermined voltage range. If 424 is true, control may continue with 428. If 424 is false, control may end and discontinue the determination of the maximum load for the one of the brake actuators 154. If the voltage is outside of the predetermined voltage range, the current or power of the one of the brake actuators 154 may not be suitable for use in a determination of the maximum load for the one of the brake actuators 154.

At 428, the maximum load module 344 stores the current 332 or power of the one of the brake actuators 154 along with the i-th one of the predetermined target loads (the present target load 308), such as in memory. At 432, the maximum load module 344 determines whether the counter value (I) is equal to a predetermined number of predetermined target loads to be tested. The predetermined number is an integer and may be two or more. Use of a greater number of predetermined target loads may increase accuracy of the determination, but are not necessary for the line fitting. If 432 is false, the maximum load module 344 increments the counter value (I) at 436, and 412-428 are repeated for another one of the predetermined target loads. The predetermined target loads may increase as the counter value increases. While the example of increasing target loads is provided, the present application is also applicable to other changes in target load. The result is the collection of the predetermined number of points of (a) current or power and (b) predetermined target load. If 432 is true, control continues with 440.

FIG. 7 includes an example graph of current 704 versus load 708 of a brake actuator. The Xs in FIG. 7 are points of current recorded at different ones of the predetermined target loads.

Referring now to FIGS. 4 and 7, at 440, the maximum load module 344 determines the maximum load for the one of the brake actuators 154 based on the stored points of current (or power) at different target loads. For example, as illustrated in FIG. 7, the maximum load module 344 may fit a line to the points (Xs) using a line fitting algorithm, such as linear regression or least squares line fitting. An example line is illustrated by 712 in FIG. 7.

The brake actuators 154 may have a predetermined maximum current 716. Using the line 712 fit to the points, the maximum load module 344 may set the maximum load 720 to or based on the load where the predetermined maximum current 716 intercepts the line 712. As discussed above, the maximum load module 344 determines the maximum load for each of the brake actuators 154.

Figure 5:
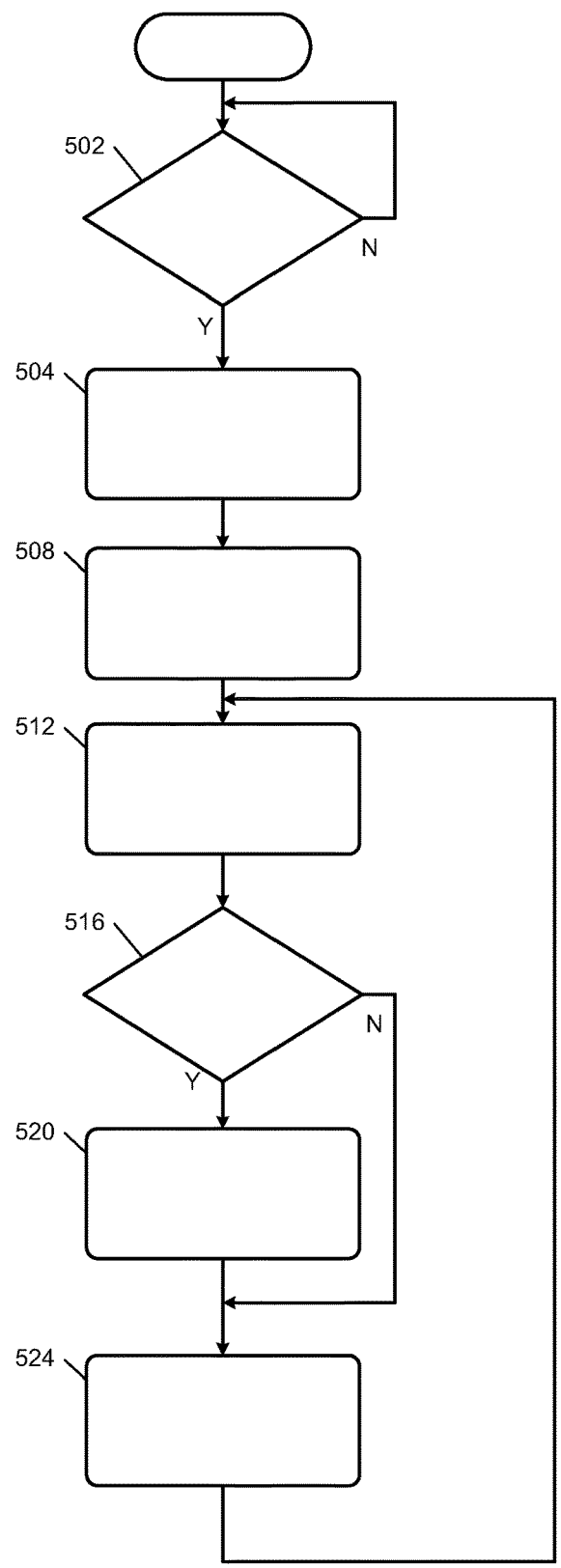
FIG. 5 is a flowchart depicting example method of controlling brake actuators.

FIG. 5 is a flowchart depicting example method of controlling the brake actuators 154. At 502, the target load module 304 may determine whether the vehicle is on. If 502 is true, control may continue with 504. If 502 is false, control may remain at 502.

At 504, the limit module 352 receives the maximum loads 348 of the brake actuators 154, respectively. The maximum load module 344 determines the maximum loads 348 as discussed above. At 508, the limit module 352 sets the limit 312 based on or equal to the smallest (least) one of the maximum loads 348.

At 512, the target load module 304 determines the target load 308 based on the BPP 170. At 516, the target load module 304 determines whether the target load determined based on the BPP 170 is greater than the clamp load limit 312. If 516 is true, the target load module 304 sets the target load 308 to the clamp load limit at 520 and control continues with 524. If 516 is false, the target load module 304 leaves the target load 308 set based on the BPP 170 and control continues with 524. At 524, the power control module 316 applies power to the brake actuators 154 based on the target load 308 and actuates the brake actuators 154 to achieve the target load 308. Control returns to 512.

Figure 6:
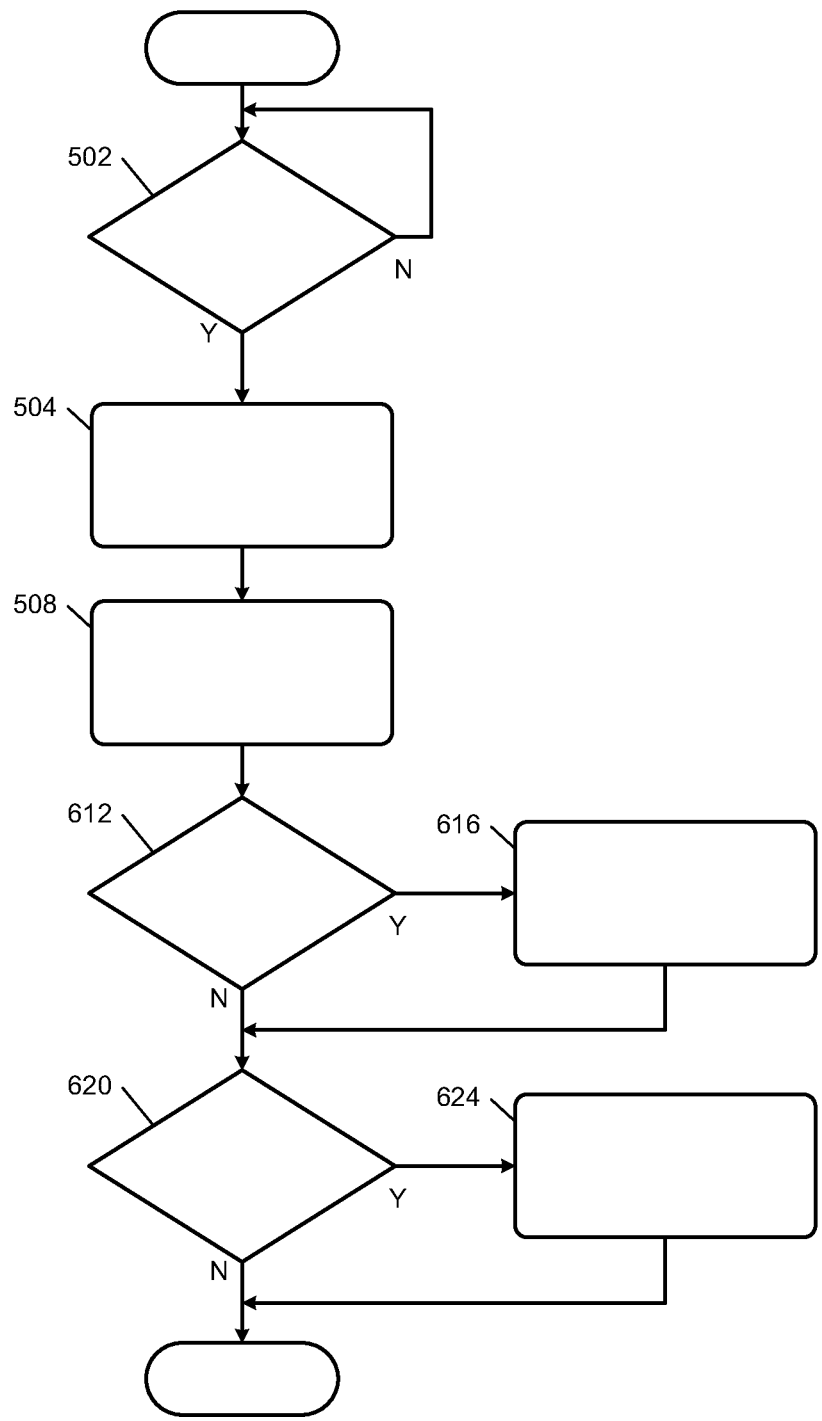
FIG. 6 is a flowchart depicting an example method of diagnosing degradation of brake actuators.

FIG. 6 is a flowchart depicting an example method of diagnosing degradation of the brake actuators 154. FIG. 6 may be performed in parallel with the example of FIG. 5. Control may begin with 502-508 as discussed above.

At 612, the diagnostic module 356 determines whether the limit 312 is less than the first predetermined value (load). The first predetermined value is greater than zero. If 612 is true, the diagnostic module 356 may output the indicator that one or more of the brake actuators 154 is degraded via one or more of the output devices 184 at 616, and control may continue with 620. If 612 is false, control may continue with 620.

At 620, the diagnostic module 356 determines whether the limit 312 is less than the second predetermined value (load). The second predetermined value is greater than zero and may be less than the first predetermined value. A decreasing value of the limit 312 may indicate increasing degradation of one or more of the brake actuators 154. If 620 is true, the diagnostic module 356 may schedule performance of the high force diagnostic at 624, and control may end. The high force diagnostic may be performed when or after scheduled. If 620 is false, control may continue with 624.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A brake actuator control system for a vehicle, comprising:
a maximum load module configured to determine maximum clamping loads of each respective brake actuator of the vehicle, the vehicle including more than two brake actuators;
the brake actuators configured to, independently of each other, slow rotation of wheels, respectively, of the vehicle;
a limit module configured to set a load limit to a minimum one of the respective maximum clamping loads of the brake actuators;
a target load module configured to limit a target load for each of the brake actuators to less than or equal to the load limit; and
a power control module configured to apply power to electric motors of the brake actuators, respectively, based on the target load.

2. The brake actuator control system of claim 1 wherein the target load module is configured to determine the target load based on a brake pedal position.

3. The brake actuator control system of claim 1 wherein the maximum load module is configured to determine the maximum clamping loads of brake actuators, respectively, while the vehicle is off.

4. The brake actuator control system of claim 1 wherein the maximum load module is configured to determine one of the maximum clamping loads of one of the brake actuators based on:
a first current through the one of the brake actuators at a first value of the target load at a first time; and
a second current through the one of the brake actuators at a second value of the target load at a second time,
wherein the second value is one of greater than and less than the first value.

5. The brake actuator control system of claim 4 wherein:
the second time is after the first time; and
the second value is greater than the first value.

6. The brake actuator control system of claim 4 wherein the maximum load module is configured to:
fit a line based on the first current, the first value, the second current, and the second value; and
determine the one of the maximum clamping loads of the one of the brake actuators based on the line.

7. The brake actuator control system of claim 6 wherein the maximum load module is configured to determine the one of the maximum clamping load of the one of the brake actuators based on a value of load where a predetermined maximum current intercepts the line.

8. The brake actuator control system of claim 6 wherein the maximum load module is configured to fit the line using at least one of linear regression and least squares line fitting.

9. The brake actuator control system of claim 4 wherein the maximum load module is configured to determine the one of the maximum clamping loads of the one of the brake actuators further based on:
a third current through the one of the brake actuators at a third value of the target load at a third time,
wherein the third value is different than the first and second values.

10. The brake actuator control system of claim 9 wherein:
the second time is after the first time and the third time is after the second time, and
the second value is greater than the first value, and the third value is greater than the second value.

11. The brake actuator control system of claim 4 wherein the first and second currents are measured when first and second voltages on the one of the brake actuators are within a predetermined voltage range.

12. The brake actuator control system of claim 1 wherein the brake actuators are one of electro mechanical brake actuators and electro hydraulic brake actuators.

13. The brake actuator control system of claim 1 further comprising a diagnostic module configured to diagnose degradation of at least one of the brake actuators based on the load limit.

14. The brake actuator control system of claim 13 wherein the diagnostic module is configured to output an indicator that at least one of the brake actuators is degraded when the load limit is less than a predetermined value.

15. The brake actuator control system of claim 14 wherein the diagnostic module is configured to at least one of:
audibly output the indicator via a speaker; and
visually output the indicator on a display.

16. The brake actuator control system of claim 14 wherein the diagnostic module is configured to schedule performance of a diagnostic of the brake actuators when the load limit is less than a second predetermined value.

17. The brake actuator control system of claim 16 wherein the second predetermined value is less than the predetermined value.

18. A brake actuator control method for a vehicle, comprising:
determining maximum clamping loads of each respective brake actuators, of the vehicle, the vehicle including more than two brake actuators;
the brake actuators configured to, independently of each other, slow rotation of wheels, respectively, of the vehicle;
setting a load limit to a minimum one of the respective maximum clamping loads of the brake actuators;
limiting a target load for each of the brake actuators to less than or equal to the load limit; and
applying power to electric motors of the brake actuators, respectively, based on the target load.

19. The brake actuator control method of claim 18 further comprising determining the target load based on a brake pedal position.

20. The brake actuator control method of claim 18 wherein the determining maximum clamping loads of brake actuators includes determining the maximum clamping loads of the brake actuators, respectively, while the vehicle is off.

* * * * *